Figure 1:
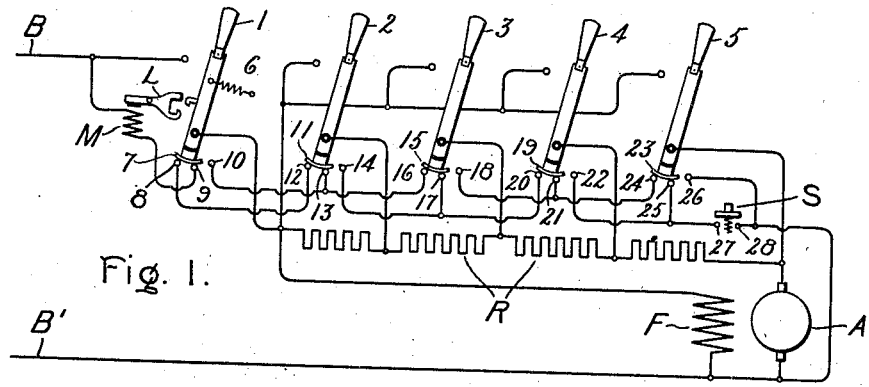

No. 834,128. PATENTED OCT. 23, 1906.
L. A. HAWKINS.
ELECTRIC SWITCH.
APPLICATION FILED FEB. 1, 1906.

Witnesses:
George H. Tilden
Helen Alford

Inventor:
Laurence A. Hawkins,
by Albert G. Davis
Att'y

UNITED STATES PATENT OFFICE.

LAURENCE A. HAWKINS, OF SCHENECTADY, NEW YORK, ASSIGNOR TO GENERAL ELECTRIC COMPANY, A CORPORATION OF NEW YORK.

ELECTRIC SWITCH.

No. 834,128.   Specification of Letters Patent.   Patented Oct. 23, 1906.

Application filed February 1, 1906. Serial No. 299,024.

*To all whom it may concern:*

Be it known that I, LAURENCE A. HAWKINS, a citizen of the United States, residing at Schenectady, county of Schenectady, State of New York, have invented certain new and useful Improvements in Electric Switches, of which the following is a specification.

My invention relates to switches for electric circuits, and is particularly applicable to motor-starting switches, although it is not limited to this particular application.

For starting large motors it is frequently difficult and expensive to construct a single switch for successively cutting out the sections of the starting resistance, since the amount of current in large motors is great and trouble arises from arcing at the switch-contacts. It has been proposed heretofore in such cases to employ a plurality of switches of the ordinary knife-blade type, each arranged to cut out a section of the resistance. Separate switches of this type can easily be designed to handle the necessary current without arcing; but the sections of the starting resistance cut out by the several switches ordinarily differ greatly in amount in order to obtain a smooth acceleration of the motor, and if the switches are closed in the wrong order excessive rushes of current may be produced to the damage of the motor. It has consequently been proposed heretofore to employ a mechanical interlock for the several switches so arranged as to prevent their closing, except in a predetermined order. When all the switches are open, all but the first switch are mechanically locked in open position. The closing of the first switch renders it possible to close the second switch, and so on.

The object of the present invention is to avoid the necessity of employing a mechanical interlock, while affording proper protection to the motor against rushes of current due to closing the wrong switch first. I secure this protection not by preventing the closure of the switches except in a predetermined order, but instead provide means for immediately breaking the circuit if any switch is closed out of its turn. I accomplish this by means of a circuit-breaking device controlled by auxiliary contacts controlled by the several switches. The contacts are so arranged that if the switches are closed in the proper order the circuit-breaking device remains inoperative; but if any switch is closed out of its turn the circuit-breaking device comes immediately into action to open the circuit. In this way adequate protection is obtained for the motor, and the necessity of any mechanical connection whatever between the several switches is avoided.

My invention in one aspect thus consists in the combination, with an electric circuit, of a plurality of independently-movable switches in the circuit and means for automatically breaking the circuit upon closing the switches out of a predetermined order.

My invention further consists in providing electrically-controlled means for preventing the closing of the first switch unless all the other switches are open. If it were not for this feature, the motor might be started up and the first switch opened so as to stop the motor and then closed again with all the resistance out of circuit. With my invention while it is possible to close any one of the switches first it is impossible to close the motor-circuit except by opening all the switches and then closing the first switch, and it is impossible to keep the circuit closed except by closing the remaining switches in the proper order.

My invention further consists in using a single magnet both to prevent the closing of the first switch as long as any one of the other switches is closed and to trip the first switch upon the closing of any other switch out of its proper order.

My invention further consists in utilizing the no-voltage release-magnet ordinarily employed in motors for performing both of these functions.

My invention further comprises other features which will be pointed out specifically in the appended claims and will be best understood by reference to the following specification and accompanying drawings, in which—

Figure 2:
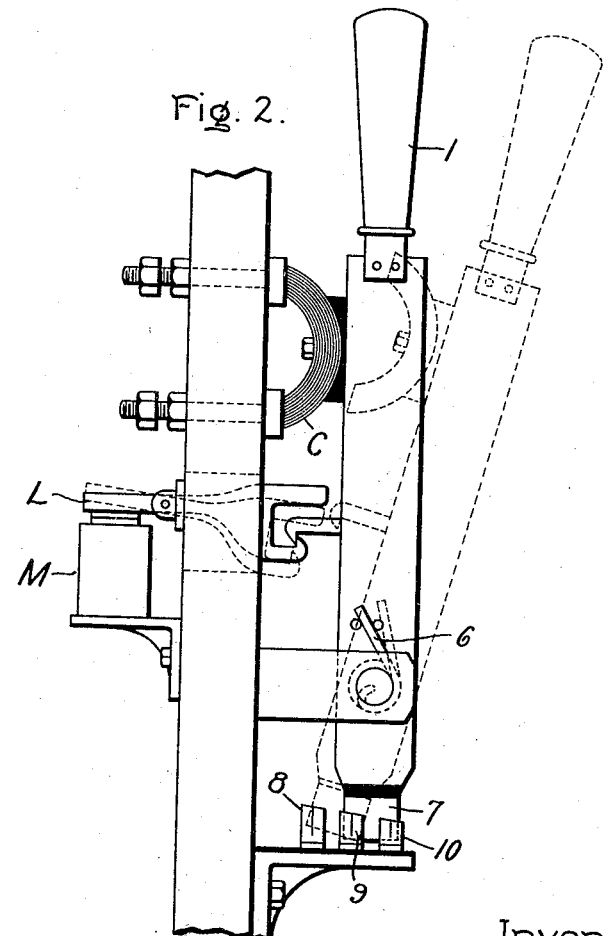

Figure 1 shows diagrammatically an arrangement of switches in accordance with my invention as applied to starting a shunt-wound electric motor, and Fig. 2 shows a side elevation of the first switch or circuit-breaker.

In the drawings, A represents the armature and F, the field, of a shunt-wound motor, and R represents a suitable resistance for connection in the motor-circuit at starting.

1, 2, 3, 4, and 5 represent five independently-movable switches. Switch 1 is of the circuit-breaker type—that is, it is provided with a spring 6, which tends to pull it to open position when released by its latch.

L represents the latch for holding the switch in closed position, and M represents the usual no-voltage release-magnet controlling the latch L. Whenever the magnet M is deënergized, the latch L is allowed to move so as to release the circuit-breaker 1. This latch L is further arranged so that when the magnet M is deënergized and the switch 1 is open the latch serves as a stop to prevent the closing of the switch. In other words, magnet M must be energized in order that switch 1 may be closed, and if the magnet becomes deënergized while the switch is closed the switch is immediately tripped. The switches 1 to 5 carry the auxiliary movable contacts 7, 11, 15, 19, and 23, respectively, which in each position of each switch bridge a pair of stationary contacts in circuit with magnet M.

S represents a spring-actuated switch which is shown as of the push-button type, normally open, but arranged when closed to bridge contacts 27 and 28. B B' represent leads from the bus-bars or other source of current.

The switches are shown in the starting position. It will be seen that the circuit of magnet M is broken at switch S. This magnet is consequently deënergized and the latch L is in position to prevent closing of switch 1. If switch S is depressed and if all the switches are in open position, as shown, the circuit of magnet M will be closed, as follows: from lead B, through magnet M, contacts 9, 7, 8, 12, 11, 13, 16, 15, 17, 20, 19, 21, 24, 23, 25, and switch S, to lead B'. The magnet M is consequently energized, shifting the pivoted latch L so as to permit the closing of switch 1. If, however, any of the switches is closed, magnet M cannot be energized and switch 1 cannot be closed. For instance, if switch 2 is closed the circuit of magnet M will be open at contact 12. If switch 3 should be closed, the circuit of magnet M would be open at contact 16, &c. In other words, in order to close switch 1 all the other switches must be open and switch S held depressed. It will be seen that when switch 1 is open the motor-circuit is open, regardless of the positions of the other switches, and consequently the motor-circuit cannot be closed unless switches 2 to 5, inclusive, are open and all the resistance R is in circuit with the motor-armature. Now, if switches 2 to 5 are open switch S is depressed and switch 1 is closed. The motor-circuit will be closed from lead B, through switch 1, through resistance R and armature A, and also through field F in parallel to the resistance, and the armature, to lead B'. The motor consequently starts with all the resistance in series. The closing of switch 1 has shifted contact 7 from contact 8 to contact 10, so that now switch 2 may be closed without breaking the circuit of magnet M. If, however, any other switch—such, for instance, as 3 or 4, is closed—instead of closing switch 2 the circuit of magnet M is broken at contact 16 or contact 20 and switch 1 immediately tripped to open the motor-circuit. After switch 2 is closed, however, switch 3 may be closed without deënergizing the magnet M; but if instead of closing switch 3 either switch 4 or switch 5 is closed the circuit of magnet M will be broken at contact 20 or contact 24. Closing switch 3 renders it possible to close switch 4 without deënergizing magnet M, and similarly the closing of switch 4 renders it possible to close switch 5 without breaking the magnet-circuit. Until switch 5 is closed switch S must be held depressed, as otherwise the magnet-circuit would be opened and switch 1 tripped. When switch 5 is closed, however, contact 23 bridges contacts 25 and 26, thereby short-circuiting switch S and rendering it inoperative. The purpose of switch S is to make it impossible for the attendant to close a portion of the switches and then go away, leaving them in this condition, which would be exceedingly undesirable, as the motor-starting resistance is not usually designed with sufficient size and heat-radiating capacity to carry the motor-current continuously. By using switch S it is necessary to close all the switches before leaving them, for otherwise switch 1 would be tripped as soon as switch S was released by the operator. The use of switch S, while possessing the advantages above pointed out, is not a necessary element of my invention in its broader aspect and may be omitted, in which case contacts 27 and 28 would be connected permanently together and contact 26 omitted. After the motor has once been started it can be shut down by opening either of switches 2, 3, or 4, thereby deënergizing magnet M, or by tripping the latch L by hand. In either case the switch 1 would be thrown open, so as to break the motor-circuit. Then before the motor-circuit can again be closed it will be necessary to open all the other switches, as has been heretofore pointed out.

Fig. 2 shows switch 1 on an enlarged scale in order to show clearly the operation of the latch L. The switch may be of any well-known type, and in practice any standard circuit-breaker construction may be employed. For the sake of simplicity I have indicated switch 1 as consisting of a pivoted lever carrying the laminated contacts C, adapted to bridge the stationary contacts when the switch is closed and provided with a spring 6 to throw the switch to open position when released by the latch. Contact 7 is shown as integral with the pivoted lever and moved thereby, so as to bridge contacts 8 and 9 or 9 and 10, according as the switch is in open or closed position. The latch L is so shaped that when released by the magnet, so that it moves to the position indicated in dotted lines, it will prevent the closing of the switch if open or will release it if closed. When magnet M is energized, so as to hold latch L in the position shown in full lines, the switch may be closed and when closed is latched firmly in position. The specific construction of the switch and latch form no part of my invention, but may be modified as desired.

I do not desire to limit myself to the particular construction and arrangement of parts or the specific circuit connections here shown, but aim in the appended claims to cover all modifications which are within the scope of my invention.

What I claim as new, and desire to secure by Letters Patent of the United States, is—

1. In combination with an electric circuit, a plurality of independently-movable switches in said circuit, and means for automatically breaking said circuit upon the closing of said switches out of a predetermined order.

2. In combination with an electric circuit, a plurality of independently-movable switches in said circuit, and means jointly controlled by said switches arranged to remain inoperative upon the closing of said switches serially in a predetermined order and to break said circuit automatically upon the closing of said switches out of said order.

3. In combination with an electric circuit, a plurality of independently-movable switches in said circuit, an electromagnet jointly controlled by said switches, and means controlled by said electromagnet for automatically breaking said circuit upon the closing of said switches out of a predetermined order.

4. In combination with an electric circuit, a plurality of mechanically-independent switches in said circuit, and electrically-controlled means for preventing the closing of a certain one of said switches unless all the other switches are open.

5. In combination with an electric circuit, a plurality of mechanically-independent switches in said circuit, an electromagnet jointly controlled by said switches, and means controlled by said electromagnet for preventing the closing of a certain one of said switches unless all the other switches are open.

6. In combination with an electric circuit, a plurality of mechanically-independent switches in said circuit, a movable stop adapted in one position to prevent the closing of a certain one of said switches, a magnet for shifting said stop, and a plurality of switch-contacts controlled by the several switches in circuit with said magnet.

7. In combination with an electric circuit, a plurality of mechanically-independent switches in said circuit, a movable stop adapted in one position to prevent the closing of a certain one of said switches, a magnet adapted when energized to shift said stop to permit the closing of said switch, and switch-contacts controlled by the several switches arranged to close the circuit of said magnet when all of said switches are open.

8. In combination with an electric circuit, a plurality of independently-movable switches in said circuit, means for preventing the closing of a certain one of said switches unless all the other switches are open, and means for breaking said circuit upon the closing of the remaining switches out of a predetermined order.

9. In combination with an electric circuit, a plurality of independently-movable switches in said circuit, means for preventing the closing of a certain one of said switches unless all the other switches are open, and means for opening said switch upon the closing of the remaining switches out of a predetermined order.

10. In combination, a plurality of mechanically-independent switches, an electromagnet controlled jointly by all of said switches, and means controlled by said magnet for preventing the closing of a certain one of said switches unless all the other switches are open and for opening said switch upon the closing of the other switches out of a predetermined order.

11. In combination, a plurality of mechanically-independent switches, and a tripping device for one of said switches controlled jointly by auxiliary contacts operatively connected to the several switches.

12. In combination, a plurality of mechanically-independent switches, a spring tending to open one of said switches, a latch for holding said switch closed, and an electromagnet controlling said latch and jointly controlled by all of said switches.

13. In combination, a plurality of mechanically-independent switches and a tripping device for one of said switches electrically controlled by all of said switches jointly.

14. In combination, a plurality of mechanically-independent switches and means electrically controlled by all of said switches jointly for preventing the closing of a certain one of said switches.

15. In combination, a plurality of mechanically-independent switches and means electrically controlled by all of said switches jointly for preventing the closing of a certain one of said switches, and for tripping said switch when closed.

16. In combination with an electric circuit, a plurality of switches in said circuit, a no-voltage release device operatively connected to one of said switches, and contacts controlled by the other switches controlling said device.

17. In combination with an electric circuit, a plurality of switches in said circuit, a no-voltage release device operatively connected to one of said switches, and means for deënergizing said device upon the closing of the other switches out of a predetermined order.

18. In combination with an electric circuit, a plurality of switches in said circuit, a no-voltage release device operatively connected to one of said switches, and switch-contacts controlled by the other switches arranged to break the circuit of said device upon the closing of said switches out of a predetermined order.

19. In combination with an electric circuit, a switch in said circuit, and a no-voltage release device arranged when deënergized to prevent the closing of said switch.

20. In combination, a switch, a magnet, and means controlled by said magnet for preventing the closing of said switch and tripping said switch when closed when said magnet is deënergized.

21. In combination with an electric circuit, a switch arranged to close said circuit, a magnet connected in shunt to said circuit, and means controlled by said magnet for preventing the closing of said switch and tripping said switch when closed when said magnet is deënergized.

22. In combination with an electric circuit, a plurality of mechanically-independent switches in said circuit, a no-voltage release device operatively connected to one of said switches and arranged when deënergized to prevent the closing of said switch, and contacts controlled by the other switches controlling said device.

23. In combination with a rheostat, a plurality of mechanically-independent switches controlling the resistance thereof, and means for automatically breaking the circuit of said rheostat upon the closing of said switches out of a predetermined order.

24. In combination with a rheostat, a plurality of mechanically-independent switches controlling the resistance thereof, an electromagnet jointly controlled by said switches, and means controlled by said magnet for automatically breaking the circuit of said rheostat.

25. In combination with a rheostat, a plurality of mechanically-independent switches controlling the resistance thereof, a no-voltage release device, and contacts controlled by said switches and controlling said device.

26. In combination with a rheostat, a plurality of mechanically-independent switches controlling the resistance thereof, a no-voltage release device, and contacts controlled by said switches and arranged to break the circuit of said device upon the closing of said switches out of a predetermined order.

27. In combination with a rheostat, a switch arranged to close the circuit of the rheostat, a plurality of mechanically-independent switches arranged to short-circuit different sections of said rheostat, and means for automatically opening the first-named switch upon the closing of the other switches out of a predetermined order.

28. In combination with a rheostat, a switch arranged to close the circuit of the rheostat, a plurality of mechanically-independent switches arranged to short-circuit different sections of said rheostat, and electrically-controlled means for preventing the closing of the first-named switch unless the other switches are open.

29. In combination with a rheostat, a switch arranged to close the circuit of the rheostat, a plurality of mechanically-independent switches arranged to short-circuit different sections of said rheostat, electrically-controlled means for preventing the closing of the first-named switch unless the other switches are open, and means for automatically opening the first-named switch upon the closing of the other switches out of a predetermined order.

30. In combination with a rheostat, a switch arranged to open the circuit of said rheostat, a trip device controlling said switch, a plurality of mechanically-independent switches arranged to short-circuit different sections of said rheostat, and contacts controlled by said switches and controlling said trip device.

31. In combination with a rheostat, a manually-operated switch arranged to open the circuit of said rheostat, an electromagnet controlling the opening and closing of said switch, a plurality of mechanically-independent switches arranged to cut out different sections of said rheostat, and contacts controlled by said switches and controlling said electromagnet.

32. In combination with an electric circuit, a plurality of independently-movable switches in said circuit, an electromagnet, means controlled by said magnet for breaking said circuit when the magnet is deënergized, contacts controlled by said switches for deënergizing said magnet upon the closing of said switches out of a predetermined order, and a normally open switch in circuit with said magnet and arranged to be short-circuited by the closing of the last of the first-named switches.

33. In combination with an electric circuit, a plurality of independently-movable switches in said circuit, an electromagnet, means controlled by said magnet for breaking said circuit when the magnet is deënergized, contacts controlled by said switches for deënergizing said magnet upon the closing of said switches out of a predetermined order, and a switch arranged normally to deënergize said magnet and to be rendered inoperative by the closing of the last of the first-named switches.

34. In combination with an electric circuit, a plurality of independently-movable switches in said circuit, an electromagnet, means controlled by said electromagnet for breaking said circuit, contacts controlled by said switches and jointly controlling said electromagnet, and a spring-actuated switch-controlling said electromagnet and arranged to be rendered inoperative by the closing of the last of the first-mentioned switches.

In witness whereof I have hereunto set my hand this 31st day of January, 1906.

LAURENCE A. HAWKINS.

Witnesses:
BENJAMIN B. HULL,
HELEN ORFORD.